United States Patent

Nissfolk et al.

[19]

[11] Patent Number: 6,125,715
[45] Date of Patent: Oct. 3, 2000

[54] DEVICE IN A ROBOT ARM

[75] Inventors: Rafael Nissfolk, Västerås; Christer Lundström, Enköping, both of Sweden

[73] Assignee: ABB AB, Västerås, Sweden

[21] Appl. No.: 09/202,360

[22] PCT Filed: Jun. 11, 1997

[86] PCT No.: PCT/SE97/01016

§ 371 Date: Jan. 12, 1999

§ 102(e) Date: Jan. 12, 1999

[87] PCT Pub. No.: WO97/47441

PCT Pub. Date: Dec. 18, 1997

[30] Foreign Application Priority Data

Jun. 12, 1996 [SE] Sweden ................................. 9602315

[51] Int. Cl.[7] .................................................. B25J 18/00
[52] U.S. Cl. ...................... 74/490.2; 74/490.03; 901/23; 901/26; 901/50
[58] Field of Search ........................... 74/490.02, 490.03; 901/23, 26, 50

[56] References Cited

U.S. PATENT DOCUMENTS

| | | | |
|---|---|---|---|
| 4,427,170 | 1/1984 | Truninger | 248/51 |
| 4,499,341 | 2/1985 | Boyd | 242/107 X |
| 4,712,972 | 12/1987 | Nakashima et al. | 901/50 X |
| 4,793,203 | 12/1988 | Staggl et al. | 901/23 X |
| 4,864,888 | 9/1989 | Iwata | 901/23 X |
| 5,375,480 | 12/1994 | Nihei et al. | 901/23 X |
| 5,816,107 | 10/1998 | Takahashi et al. | 74/490.02 |
| 5,848,556 | 12/1998 | Ryu et al. | 74/490.02 |

FOREIGN PATENT DOCUMENTS

| | | |
|---|---|---|
| 0502832 | 3/1992 | European Pat. Off. . |
| 3410637 | 3/1985 | Germany . |
| 9000697 | 10/1991 | Sweden . |

OTHER PUBLICATIONS

English translation of Abstract and of Claim 1 of German published application 3410637.

*Primary Examiner*—Allan D. Herrmann
*Attorney, Agent, or Firm*—Watson Cole Grindle Watson, P.L.L.C.

[57] ABSTRACT

A robot arm comprises an assembly (6) rotatable relative to a part (2) of the arm about an axis extending at an angle to a longitudinal axis of the arm part, said assembly comprising a drive unit (8) and a member (9) driven by the drive unit. A cable (35, 36) comprising one or more lines for communication of energy for driving and/or control purposes extends between the arm part (2) and the drive unit (8). The assembly (6) comprises an axle pin (13) rotatably supported relative to the arm part (2). The cable extends in a space (48) provided in the assembly and comprising a first part space (49) provided in the axle pin (13), the cable being coiled in screw-line-shape in said first part space, and a second part space (50), in which the cable extends from the first part space (49) to the drive unit. The two part spaces (49, 50) are separated from each other in a sealed manner by means of a separation element (51) which has first sealing members for adjoining sealingly to a wall delimiting the space and second members for sealed passage of the cable.

8 Claims, 3 Drawing Sheets

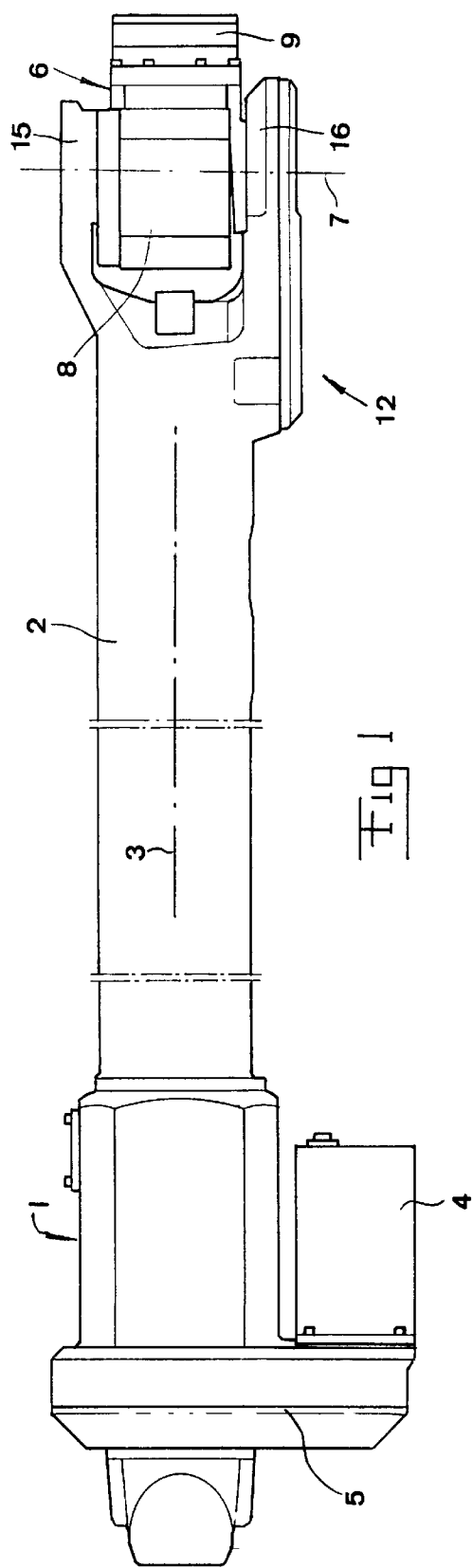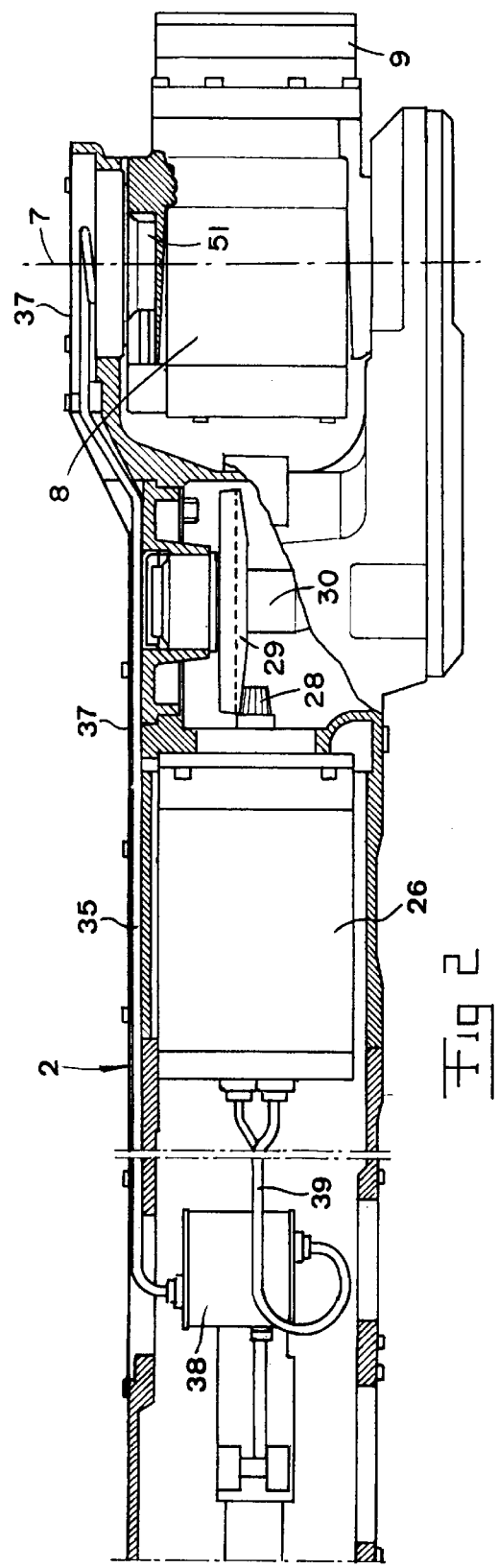

DEVICE IN A ROBOT ARM

FIELD OF THE INVENTION AND PRIOR ART

The present invention is related to a device in a robot arm of the kind comprising an assembly rotatable in relation to a part of the arm about an axis extending at an angle to a longitudinal axis of the arm part, the assembly comprising a drive unit and a member driven by the drive unit, at least one cable comprising one or more lines for communication of energy for driving and/or control purposes extending between the arm part and the drive unit, the assembly comprising an axle pin rotatably supported relative to the arm part, the cable extending, between the arm part and the drive unit, in a space provided in the assembly, the space comprising a first part space provided in the axle pin, the cable being coiled in screw-line-shape in the first part space.

Such a device is described in our Swedish patent No 9000697-4. In this prior device, the cable extends out of said space through an opening formed in a wall of the space and from this opening exteriorly of the assembly to a lead-through, in which the cable is introduced into the drive unit. Thus, the cable will be exposed outwardly between the opening and the lead-through, which means a less satisfactory protection for the cable. The exposed extent of the cable exteriorly of the assembly means, furthermore, that it would be more difficult to efficiently seal the interior of the drive unit relative to the surroundings. This involves difficulties in achieving such a high class of tightness, which would be desirable in this connection.

OBJECT OF THE INVENTION

The object of the invention is to devise constructive ways to provide possibilities for achieving, while maintaining a design as uncomplicated as possible, an improved design as far as cable protection and cabling tightness are concerned.

SUMMARY OF THE INVENTION

The object of the invention is achieved by designing the device so that the space in the assembly comprises a second part space, in which the cable extends from the first part space to the drive unit, and that the two part spaces are separated from each other in a sealed manner by means of a separation element, the separation element and a wall delimiting the space being adapted to sealingly adjoin to each other and the separation element and the cable being adapted to sealingly adjoin to each other whereas the cable penetrates the separation element.

Thus, the cable will run well protected within the space formed by the two part spaces whereas the separation element efficiently provides for the required tight separation of the part spaces from each other. Expressed in other words, the cable will, accordingly, be adequately separated from the surroundings in the second part space, which means that contamination cannot enter the interior of the drive unit via the second part spacer in which the cable extends in a well protected manner.

According to a preferred embodiment, the separation element has one more first annular sealing members adapted for sealing against the inside of the first part space.

According to a particularly preferred embodiment of the invention the separation element has the character of a cup-shaped body, in the wall of which a passage for the cable is provided.

Further features and developments of the invention are dealt with in the appended claims and the following description.

BRIEF DESCRIPTION OF THE DRAWINGS

With reference to the enclosed drawings, a more specific description of an embodiment example of the invention follows hereinafter.

In the drawings:

FIG. 1 is a diagrammatical view of a robot arm designed in accordance with the invention, FIG. 2 is a view of a portion of the arm according to FIG. 1 in a somewhat larger scale and in a partly cut condition.

DETAILED DESCRIPTION OF A PREFERRED EMBODIMENT

Figure 3:
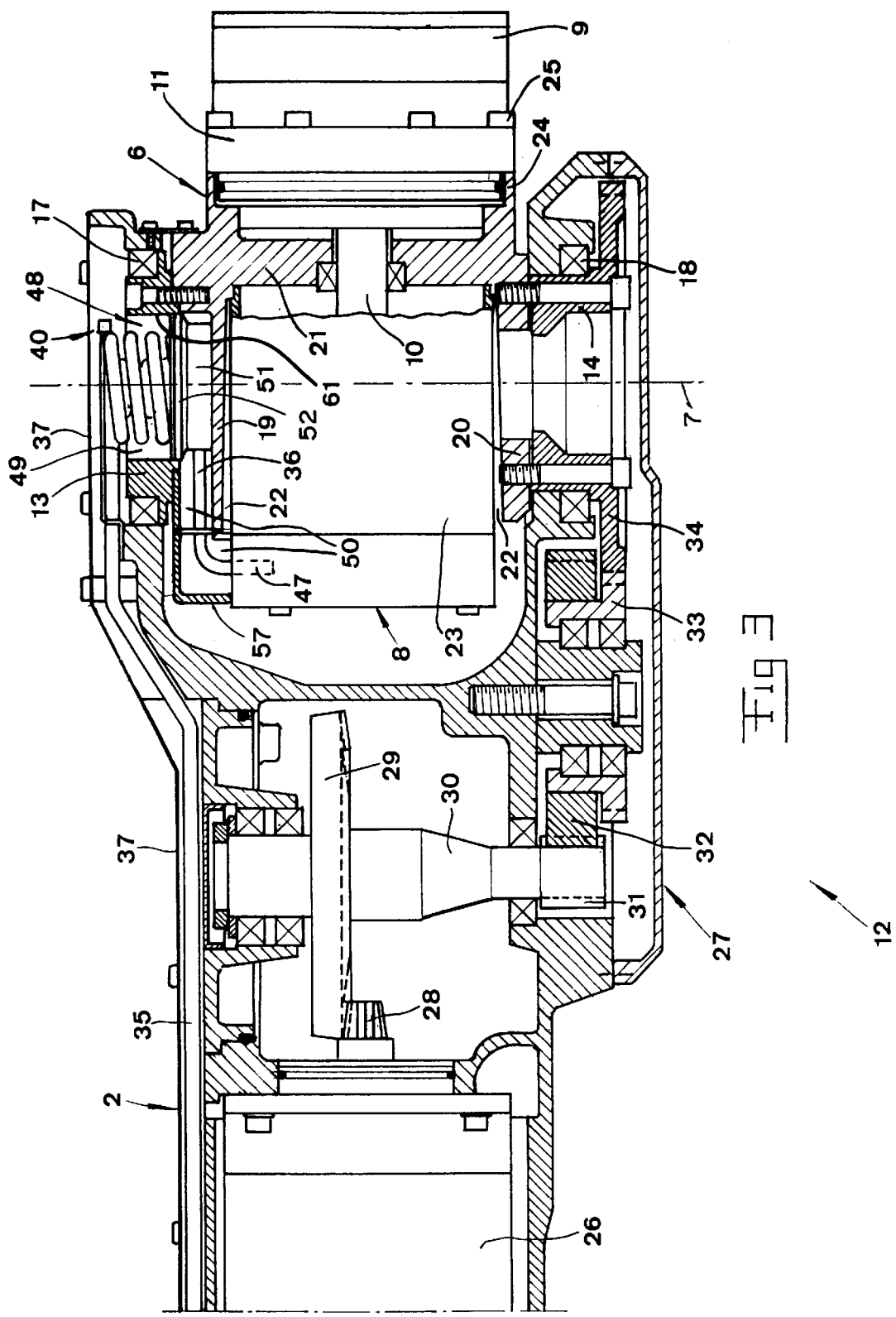
FIG. 3 is an enlarged view of a detail of FIG. 2 in a cut state.

The robot arm illustrated in FIG. 1 is intended to be included in an industrial robot, for instance of the type shown in ABB magazine 1989, No. 7, pages 3–10. The robot arm comprises a rear part 1 and a forward part 2 supported in the rear part, said forward part 2 being rotatable relative to the rear part about a longitudinal axis 3 of the arm. A motor denoted 4 may serve for this rotation, said motor acting on the arm part 2 via a suitable transmission 5 in a manner well-known per se within this art. It is pointed out that the robot arm 1 is intended to form an outer robot arm of an industrial robot in a manner known within the art.

The forward arm part 2 comprises at its outer end portion an assembly generally denoted 6. This assembly is rotatable about an axis 7 extending at an angle, preferably a substantially right angle, to the longitudinal axis 3 of the robot arm. The assembly 6 is also denominated tilt in that it may be said to be tiltable relative to the arm part 2. The assembly 6 comprises a drive unit 8 and a member 9 driven by the drive unit. In the embodiment described the drive unit 8 is conceived to consist of an electric motor, the output shaft 10 (FIG. 3) of which puts the member 9 in rotation via a reduction gear 11, for instance in the form of a planatary gear. The member 9 is in practise conceived to be rotatable about an axis extending at an angle, preferably a substantially right angle, to the axis 7 of rotation of the assembly 6. It is suitable, although not necessary, that the axis of rotation of the member 9 is substantially parallel to the output axle 10 of the motor. The member 9 has suitably the character of a carrier or attachment for any suitable tools or working implements desired be operated by means of the robot.

The outer end portion of the forward arm part 2 may be said to consist of a wrist, comprising a wrist housing 12 with a fork-like extension, in which the wrist assembly 6, the tilt, is supported.

The assembly 6 is rigidly connected to two axle pins 13, 14 placed in line with each other, said axle pins being rotatably supported in those two forks of the wrist housing which are denoted 15 and 16 respectively in FIG. 1 by means of bearings 17 and 18 respectively.

It is indicated in the example that the suspension of the assembly 6 on the axle pins 13, 14 have been obtained by means of two flanges 19, 20 arranged on opposite sides of the mantle surface of the motor. These flanges are in the example illustrated as being arranged in one piece with one end gable 21 of the motor housing. The side flanges 19, 20 and the end gable 21 form, accordingly, an U-shaped (fork-like) flange structure in this example, an open gap 22 being left between the side flanges and the mantle part 23 of the motor housing. Expressed in other words, the mantle part 23 of the motor housing is, in the example, inserted in its place and secured between the flanges 19, 20.

The mantle part 23 of the motor housing is in the embodiment illustrated formed by an extruded aluminium profile. In a manner more closely described in our previous Swedish patent No. 9000697-4, this profile may be provided with longitudinally extending holes for securing bolts securing the mantle part 23 to the end gable 21.

The end gable 21 of the motor housing is formed with an axially protruding collar 24 and axially directed screw holes (not shown) are arranged about the periphery and intended to co-operate with screws 25 for fixing the reduction gear 11 to the end gable 21. Rotation of the assembly 6 about its axis denoted 7 is obtained by means of a drive motor 26. This motor acts in a force applying manner on the assembly 6 via a transmission generally denoted 27. This transmission is in the example illustrated as comprising a bevel gear wheel 28 fixed on the axle of the motor 26, said bevel gear wheel being in engagement with a bevel gear wheel 29, which is secured to an axle 30 rotatably supported in the wrist housing 12, the axle 30 extending perpendicularly to the axis 3 of rotation of the forward arm part 2. One end portion of the axle 30 is provided with a gear 31 in engagement with an intermediate wheel comprising two coaxial and mutually rigidly connected gear wheels 32 and 33, said intermediate wheel being in engagement with a gear wheel 34, which is connected, for example shaped in one piece, in such a manner that it is secured against relative rotation to the previously mentioned axle pin 14, which forms a part secured against rotation relative to the assembly 6.

Also the motor 26 is in the example conceived to be an electric motor.

FIG. 2 illustrates that a cable generally denoted 35, which comprises one or more lines for communication of energy for drive and/or control purposes, extends in a channel formed along the arm part 2. This channel is closed outwardly by means of one or more caps, cover members etc. 37. As will be described later, two cables 35, 36 extend in a parallel relation in this example. However, only one of these cables appears in FIG. 2. The cables comprise in reality a number of lines communicating electric driving energy to the motor 8 and also electrical signals required for adequate control of the motor 8 and the tool carrier 9 driven by the motor. The cable 35 is illustrated in FIG. 2 as coupled to a coupling member 38 arranged within the arm part 2. One or more cables 39 arrange for the motor 26 also adjoin to this coupling member 38.

Figure 4:
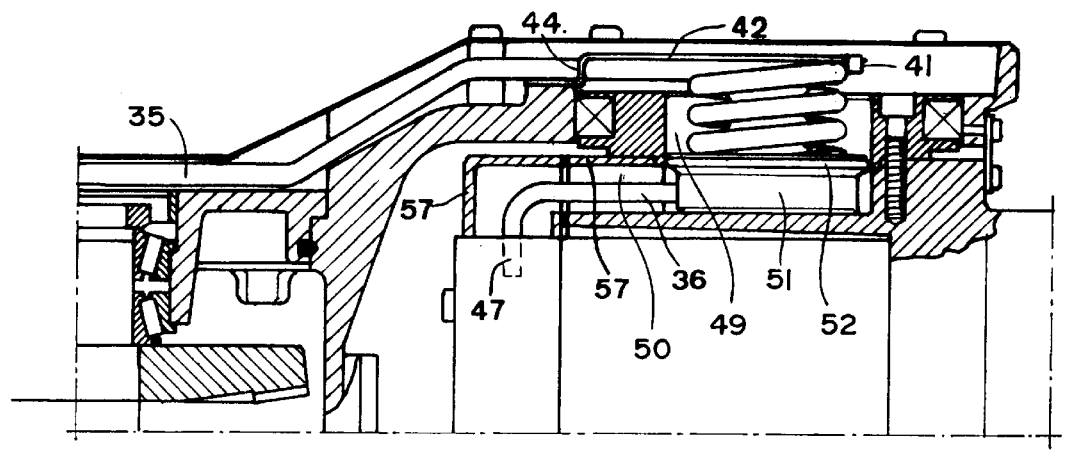
FIG. 4 is an enlarged detail also appearing in FIG. 3.
Figure 5:
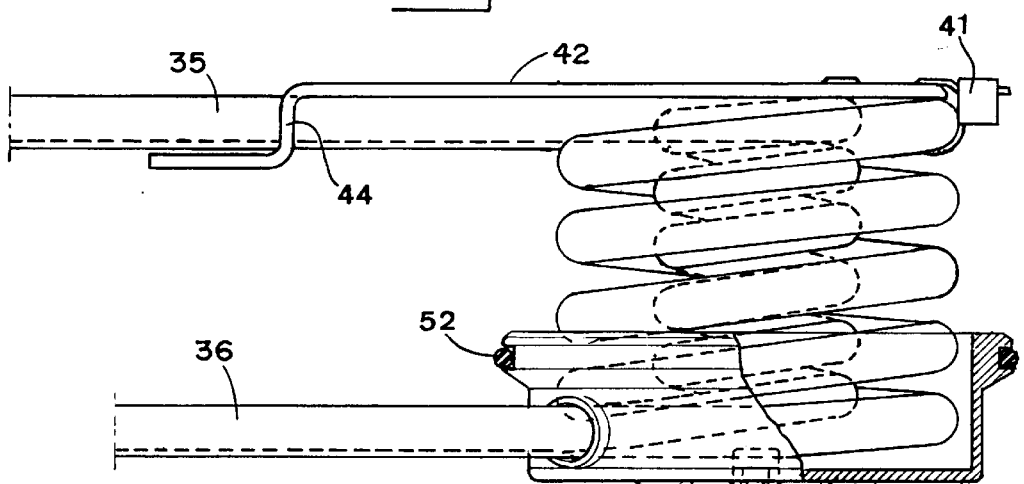
FIG. 5 is a view illustrating components separated from the robot arm and shown in an even larger scale.

As is more clearly apparent from FIGS. 3–6 the cables 35, 36 extend from the coupling member 38 to a place 40 adjacent to the fork-like outer end of the arm part 2. At this place 40, the cables 35, 36 (see in particular FIG. 6) are fixed relative to the arm part 2. There are, in reality, as appears from FIG. 6, two fixing points 40*a* and *b* at the place 40 to achieve adequate anchorage and holding of the cables 35, 36. More specifically the cables 35, 36 are secured by means of diagrammatically indicated securing members 41. These may for instance have the character of tightening members, e.g. such band-like tightening members which within the art are popularly denoted "bundle straps". These securing means 41, the nature of which also is indicated in FIG. 5, operate more specifically such that they secure the cables 35, 36 relative to a holding element 42, which in its turn is secured to the outer end of the arm part 2, for instance by being screwed to the same by means of screws protruding through holes 43 indicated in FIG. 6. As appears from FIGS. 4 and 5, the holding element 42 has a Z-shaped profile with a first flange abutting against the arm part 2, a second flange lying over the cables 35, 36 and a web 44 comprising an opening 45 for passage of the cables 35, 36. In the flange of the holding element 42 which lies over the cables 35, 36, openings 46 are provided, through which the previously described tensioning straps my be threaded so as to clamp the cables relative to the holding element 42.

Figure 6:
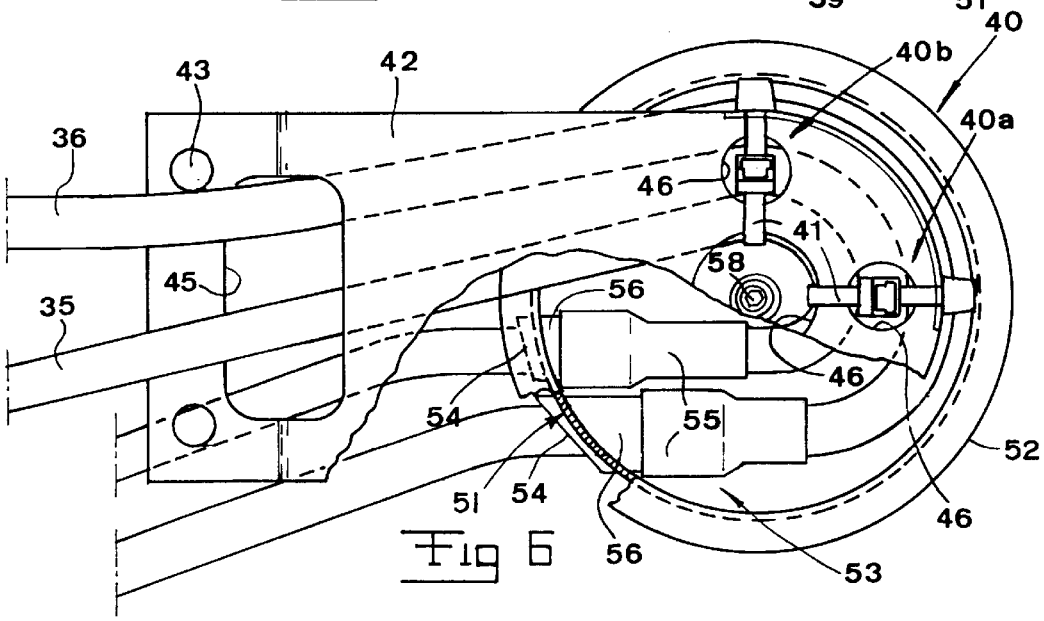
FIG. 6 is a view from above of the components appearing in FIG. 5.

The two fixing points just described are distinguished in FIG. 6 with the letter additions a and b respectively. Two such fixing points 40*a* and 40*b* are desirable since the cables then are secured in that curved shape which is aimed at, and which is more clearly apparent from FIG. 6. One single fixing point such as the one denoted 40*a* would, however, be sufficient.

Between said fixing point 40*a* relative to the arm part 2 and a point denoted 47 in FIGS. 3 and 4 on the drive unit 8, the cables 35, 36 extend in a space 48 provided in the assembly 6, said space comprising a first part space 49 formed in the axle pin 13, the cables 35, 36 being coiled in screwline-shape in said first part space.

As is clearly apparent from FIGS. 3 and 4, that space in the assembly 6 which is generally denoted 48 comprises a second part space 50, in which the cables 35, 36 extend from the first part space 49 to the point 47 on the drive unit 8. The two part spaces 49, 50 are separated from each other in a sealed manner by means of a separation element 51, which has first members 52 for sealingly adjoining to a wall delimiting the space 48 and second members 53 for sealed passage of the cables 35, 36.

As is clearly apparent from FIGS. 5 and 6, each of the two cables 35, 36 are coiled or wound in its own screw-line-shaped formation. These screw-line formations has the purpose to allow the assembly 6 to be rotated reciprocatingly about the axis denoted 7 without excessive force influences on the cables. Expressed in other words, the assembly 6 should be able to be rotated in opposite directions about the axis 7 from a neutral position, the screw line formation formed by an individual cable 35, 36 being allowed to increase its diameter on rotation in one of the directions, whereas the screw line formation on rotation in the other direction is allowed to reduce its diameter.

The first sealing member 52 of the separation element 51 is annular for sealing against the inside of the first part space 49. It is preferred that the sealing member 52 is formed by an O-ring provided in a peripheral grove formed in the separation element 51.

The separation element 51 is preferably formed by a cup-shaped body, in the wall of which passages for the cables 35, 36 are provided. The members 53 for sealed passage of the cables through the separation element 51 comprise in this embodiment openings 54 and a respective sealing component 55 for sealing connection between the circumference of the cables 35, 36 and such portions 56 of the separation element 51 which delimit the openings 54. These portions 56 are more specifically formed by tubular portions, the through holes of which form the just mentioned openings 54.

The sealing components 55 are formed by hose pieces of flexible nature. These hose pieces adjoin sealingly against the circumference of the cables 35, 36 and are arranged so that they engage the tube portions 56 exteriorly in a sealing manner. These tube portions 56 have parts protruding into the interior of the separation element 51, the hose pieces being threaded onto said parts.

The second part space 50 comprises a portion, in which the cables 35, 36 extend substantially perpendicularly relative to the axis 7 of rotation between the assembly 6 and the arm part 2.

The second part space 50 is delimited outwardly from the assembly 6 by means of the separation element 51 and one or more cover members 57 arranged on the assembly 6. As appears from FIG. 4, these cover members 57 are connected sealingly to the drive unit 8, each other and the axle pin 13/flange 19 so that the second part space 50 becomes closed off in a substantially sealed manner in a direction towards the surroundings. Expressed in other words, the separation element 51 will prevent contaminations from entering the same via the part space 49. For the rest, the cover members 57 will, in co-operation with parts of the assembly 6, separate the part space 50 outwardly so that contaminations, which could jeopardise the operation of the drive unit 8 by moving from the part space 50 further into the drive unit, cannot enter into the part space 50. Thus, even if the cables 35, 36 in the transition between the part space 50 and the interior of the drive unit 8 proper would be provided with a sealing, the occurrence of the sealing cover members 57 will, nevertheless, provide an increased safety against undesired introduction of contaminations, apart from the fact that the cover members 57 also involve efficient protection for those parts of the cables 35, 36 which extend through the part space.

The design according to the invention with part spaces 49, 50 and the separation element 51 separating these part spaces involves important advantages concerning protection and sealing and is, furthermore, simple as to its construction and as far as assembly/disassembly is concerned. The separation element 51 may be conveniently introduced into the part space 49 provided in the axle pin 13 and again withdrawn from this part space by a displacement movement parallel to the axis of the axle pin 13. It is pointed out that the separation element 51 and the part space 49 in the preferred embodiment have a cross-sectionally substantially circular shape. It is pointed out that the separation element 51 could be fixed in relation to the assembly 6 by means of suitable fixing members, e.g. such as one or more screws 58 (FIG. 5) protruding into a threaded hole in a wall forming a bottom of the part space 49, said wall being formed, in the example, by the flange 19. The separation element 51 may then comprise means 59, which in co-operation with corresponding means of the assembly 6 function centering on the separation element in the part space 49. The means 59 may consist of a projection receivable in a recess in the bottom of the part space 49. Furthermore, the separation element has members 60 for locking the element against rotation. These members may comprise one or more projections 60 receivable in corresponding recesses in the bottom of the part space 49.

It is evident that the invention described is not only restricted to the embodiment given as an example. Thus, many modifications may be made within the scope of the enclosed claims. For instance, it is pointed out that the embodiment described as far as the flanges 19, 20 and the motor mantle 23 received therebetween are concerned in no way is critical to the idea of the invention. Thus, the more specific design of the assembly 6 in this regard may be modified as desired. The intermediate gap 22 may for instance be avoided. Depending upon such modifications, the cover members 57 may easily be modified so that the part space 50 delimited by them in combination with the assembly 6 for the rest becomes suitable for allowing passage of the cables 35, 36 from the first part space 49 into the interior of the drive unit 8 in a manner which is sealed relative to the surroundings. In the embodiment example it is illustrated that the sealing member 52 is formed by a separate part arranged on the separation element 51. It is pointed out that the sealing element 52 could be provided in one piece with the separation element 51, for instance as a sealing lip of elastic material formed on the separation element. According to another alternative, an annular sealing member 52 could instead be arranged in the axle pin 13, for instance in a grove formed in the axle pin, the separation element 51 possibly having a smooth external portion intended to seal against the sealing member provided in the axle pin. As far as the sealing connection between the cable 35, 36 and the separation element 51 is concerned, the separation element 51 proper could be designed to directly seal against the cable or cables 35, 36 as a consequence of the separation element comprising sealing members formed in one piece with the separation element and adapted for sealing contact with the cables. According to an alternative embodiment, the cables themselves could be provided with sealing members adapted to seal relative to such portions of the separation element which are located around openings in the separation element. Also other detail modifications will appear obvious to men skilled in the art after study or the directives given herein. Such modifications are included within the scope of the invention.

What is claimed is:

1. A device in a robot arm comprising an assembly rotatable in relation to a part of the arm about an axis extending at an angle to a longitudinal axis of the arm part, said assembly comprising a drive unit and a member driven by said drive unit, at least one cable comprising at least one line for communication of energy for driving and/or control purposes extending between the arm part and the drive unit, said assembly comprising an axle pin rotatably supported relative to the arm part, the cable extending, between the arm part and the drive unit, in a space provided in the assembly, said space comprising a first part space provided in the axle pin, the cable being coiled in screw-line-shape in said first part space, wherein the space in the assembly comprises a second part space, in which the cable extends from the first part space to the drive unit, and wherein the two part spaces are separated from each other in a sealed manner by means of separation element, the separation element and a wall delimiting the space being adapted to sealingly adjoin each other, the second part space being delimited outwardly from the assembly by means of the separation element and at least one cover member provided on the assembly, and the separation element the cable being adapted to sealingly adjoin each other whereas cable penetrates the separation element.

2. A device according to claim 1, wherein the separation element has at least one annular sealing member for sealing against the inside of a wall of the first part space.

3. A device according to claim 1, wherein the at least one first sealing member comprises an O-ring.

4. A device according to claim 1, wherein the separation element comprises a cup-shaped body, in the wall of which a passage for the cable is arranged.

5. A device according to claim 1, wherein second sealing member for sealed passage of the cable through the separation element comprise an opening provided in the separation element and a sealing component for sealing connection between the circumference of the cable and such a portion of the separation element which delimits the opening.

6. A device according to claim 5, wherein the opening in the separation element is provided in a tubular portion of the separation element.

7. A device according to claim 6, wherein the sealing component is formed by a hose piece sealingly adjoining to the circumference of the cable and engaging sealingly externally of the tubular portion.

8. A device according to claim 1, wherein the second part space comprises a portion in which the cable extends substantially perpendicularly relative to the axis of rotation between the assembly and the arm part.

* * * * *